「US012117572B2」

(12) United States Patent
Nomura et al.

(10) Patent No.: US 12,117,572 B2
(45) Date of Patent: Oct. 15, 2024

(54) RADIOGRAPHY APPARATUS

(71) Applicant: FUJIFILM Corporation, Tokyo (JP)

(72) Inventors: Kengo Nomura, Tokyo (JP); Yasunori Narukawa, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 47 days.

(21) Appl. No.: 17/412,758

(22) Filed: Aug. 26, 2021

(65) Prior Publication Data

US 2021/0389480 A1 Dec. 16, 2021

Related U.S. Application Data

(63) Continuation-in-part of application No. PCT/JP2019/042940, filed on Oct. 31, 2019.

(30) Foreign Application Priority Data

Mar. 13, 2019 (JP) ................................. 2019-046327

(51) Int. Cl.
*G01T 1/208* (2006.01)
*G01T 1/20* (2006.01)

(52) U.S. Cl.
CPC ............ *G01T 1/208* (2013.01); *G01T 1/2002* (2013.01); *G01T 1/20184* (2020.05)

(58) Field of Classification Search
None
See application file for complete search history.

(56) References Cited

U.S. PATENT DOCUMENTS

| | | | |
|---|---|---|---|
| 2012/0126128 A1 | 5/2012 | Watanabe et al. | |
| 2013/0048866 A1 | 2/2013 | Nishino et al. | |
| 2013/0082184 A1 | 4/2013 | Nakatsugawa et al. | |
| 2013/0306875 A1* | 11/2013 | Wei | G01T 1/2006 |
| | | | 250/366 |
| 2015/0235357 A1 | 8/2015 | Nagashima et al. | |
| 2016/0220217 A1 | 8/2016 | Uchiyama | |
| 2017/0207257 A1 | 7/2017 | Nishihara | |
| 2018/0333121 A1 | 11/2018 | Kuwabara et al. | |

(Continued)

FOREIGN PATENT DOCUMENTS

| | | |
|---|---|---|
| CN | 102540235 A | 7/2012 |
| CN | 102918419 A | 2/2013 |
| CN | 102949197 A | 3/2013 |

(Continued)

OTHER PUBLICATIONS

Notice of Reasons for Refusal dated Mar. 29, 2022 from the Japanese Patent Office in JP Application No. 2021-505496.

(Continued)

*Primary Examiner* — Edwin C Gunberg
(74) *Attorney, Agent, or Firm* — Sughrue Mion, PLLC

(57) ABSTRACT

Provided is a radiography apparatus capable of changing the shape and size at an imaging site. A radiography apparatus (1) includes a scintillator (12), and a substrate (11) that is laminated on the scintillator (12) and has a plurality of photoelectric conversion elements (17) converting light emitted from the scintillator (12) into electric charges, in which a laminate including the scintillator (12) and the substrate (11) is partitioned into a plurality of blocks (10A) to (10I), and the blocks are separable from each other.

7 Claims, 12 Drawing Sheets

(56) References Cited

U.S. PATENT DOCUMENTS

2019/0120977 A1* 4/2019 Jacobs .................... G01T 1/247

FOREIGN PATENT DOCUMENTS

| | | |
|---|---|---|
| CN | 106549277 A | 3/2017 |
| CN | 108937982 A | 12/2018 |
| CN | 109196385 A | 1/2019 |
| JP | 2010-078543 A | 4/2010 |
| JP | 2011-227047 A | 11/2011 |
| JP | 2014-102202 A | 6/2014 |
| JP | 2016-140511 A | 8/2016 |
| JP | 2017-62210 A | 3/2017 |
| WO | 2016/017305 A1 | 2/2016 |
| WO | 2017/202738 A1 | 11/2017 |

OTHER PUBLICATIONS

International Preliminary Report on Patentability dated Aug. 25, 2021 with a Translation of the Written Opinion of the International Searching Authority in Application No. PCT/JP2019/042940.
International Search Report dated Jan. 21, 2020 in Application No. PCT/JP2019/042940.
Written Opinion of the International Searching Authority dated Jan. 21, 2020 in Application No. PCT/JP2019/042940.
Chinese Office Action issued Nov. 9, 2023 in Application No. 201980093970.1.
Chinese Office Action dated Apr. 17, 2024 in Application No. 201980093970.1.

* cited by examiner

RADIOGRAPHY APPARATUS

CROSS-REFERENCE TO RELATED APPLICATIONS

This application is a Continuation of PCT International Application No. PCT/JP2019/042940 filed on Oct. 31, 2019, which claims priority under 35 U.S.C § 119(a) to Japanese Patent Application No. 2019-046327 filed on Mar. 13, 2019. Each of the above application(s) is hereby expressly incorporated by reference, in its entirety, into the present application.

BACKGROUND OF THE INVENTION

1. Field of the Invention

The disclosed technology relates to a radiography apparatus.

2. Description of the Related Art

Non-destructive testing using radiation has been conventionally performed. As a technology relating to non-destructive testing, for example, JP2014-102202A discloses that a fluoroscopic image generated from an imaging plate as a radiation detection medium is acquired by emitting radiation from radiation source while the imaging plate is disposed on an outer periphery of a welded portion of a pipe to be tested and a radiation source is disposed on a central axis of the pipe.

On the other hand, as a technology relating to a radiography apparatus comprising a scintillator and a photoelectric conversion element, for example, WO2016/017305A discloses a radiation measuring device in which a pixel array unit is logically divided into regions of 1 mm square corresponding to a scintillator divided into a plurality of partitions, and scintillation light generated by the scintillator is selectively emitted to the corresponding partition in the pixel array unit.

SUMMARY OF THE INVENTION

In non-destructive testing of a pipe welded portion using radiation, an imaging plate is used as disclosed in JP2014-102202A. In order to display a latent image recorded on the imaging plate as an image, it is necessary to irradiate a surface of the imaging plate exposed by radiation with a laser beam and measure light emission according to an exposure amount of the radiation. Therefore, in the non-destructive testing using the imaging plate, it is difficult to immediately display an image. That is, in the non-destructive testing using the imaging plate, it is difficult to acquire a test result at a site and immediately take measures according to the test result at the site.

On the other hand, a digital detector array (DDA) comprising a scintillator and a photoelectric conversion element has high immediacy of image display. However, a flexible DDA that can be wound around a surface of a pipe such as an imaging plate has not yet been put into practical use. In addition, the shape and size of the DDA are defined by the standard, and the shape and size are not suitable for use by winding the DDA around the surface of the pipe. In the non-destructive testing of the pipe welded portion, the optimum shape and size of the DDA change depending on, for example, the diameter and shape of the pipe.

The disclosed technology has been made in view of the above points, and an object of the present invention is to provide a radiography apparatus capable of changing the shape and size at an imaging site.

A radiography apparatus according to the disclosed technology comprises a scintillator, and a substrate that is laminated on the scintillator and has a plurality of photoelectric conversion elements converting light emitted from the scintillator into electric charges, in which a laminate including the scintillator and the substrate is partitioned into a plurality of blocks, and the blocks are separable from each other.

Since the blocks of the laminate including the scintillator and the substrate are separable from each other, the shape and size of the laminate can be changed at an imaging site.

Each of the plurality of blocks may have a connector provided in a boundary portion with another block. As a result, it is possible to reconnect the separated blocks.

The laminate including the scintillator and the substrate may have flexibility. As a result, since the laminate can be curved, the radiography apparatus can be used for non-destructive testing of a welded portion of a pipe.

The radiography apparatus may further comprise a plurality of switching elements provided on the substrate and provided corresponding to the plurality of photoelectric conversion elements, a plurality of gate lines provided on the substrate and transmitting drive signals for driving each of the plurality of switching elements, a plurality of signal lines provided on the substrate and transmitting electric signals based on the electric charges generated by the plurality of photoelectric conversion elements, a plurality of drive circuits connected to a part of different gate lines among the plurality of gate lines and outputting the drive signals, respectively, and a plurality of signal processing circuits connected to a part of different signal lines among the plurality of signal lines and processing the electric signals, respectively. In this case, it is preferable that in each of the plurality of blocks, each of the gate lines included in the block is connected to one of the plurality of drive circuits, and each of the signal lines included in the block is connected to one of the plurality of signal processing circuits. In this way, by associating each block of the laminate with the drive circuit and the signal processing circuit, it is possible to facilitate design in the structural and control aspects.

It is preferable that the plurality of drive circuits and the plurality of signal processing circuits are provided along one side of the laminate. As a result, it is possible to suppress the complication of leading of wiring connected to the drive circuit and the signal processing circuit.

The plurality of drive circuits and the plurality of signal processing circuits may be provided along two sides of the laminate opposite to each other. In this case, the plurality of drive circuits are electrically connected to each other, and the plurality of signal processing circuits are electrically connected to each other.

According to the disclosed technology, a radiography apparatus capable of changing the shape and size at an imaging site is provided.

DESCRIPTION OF THE PREFERRED EMBODIMENTS

Figure 1:
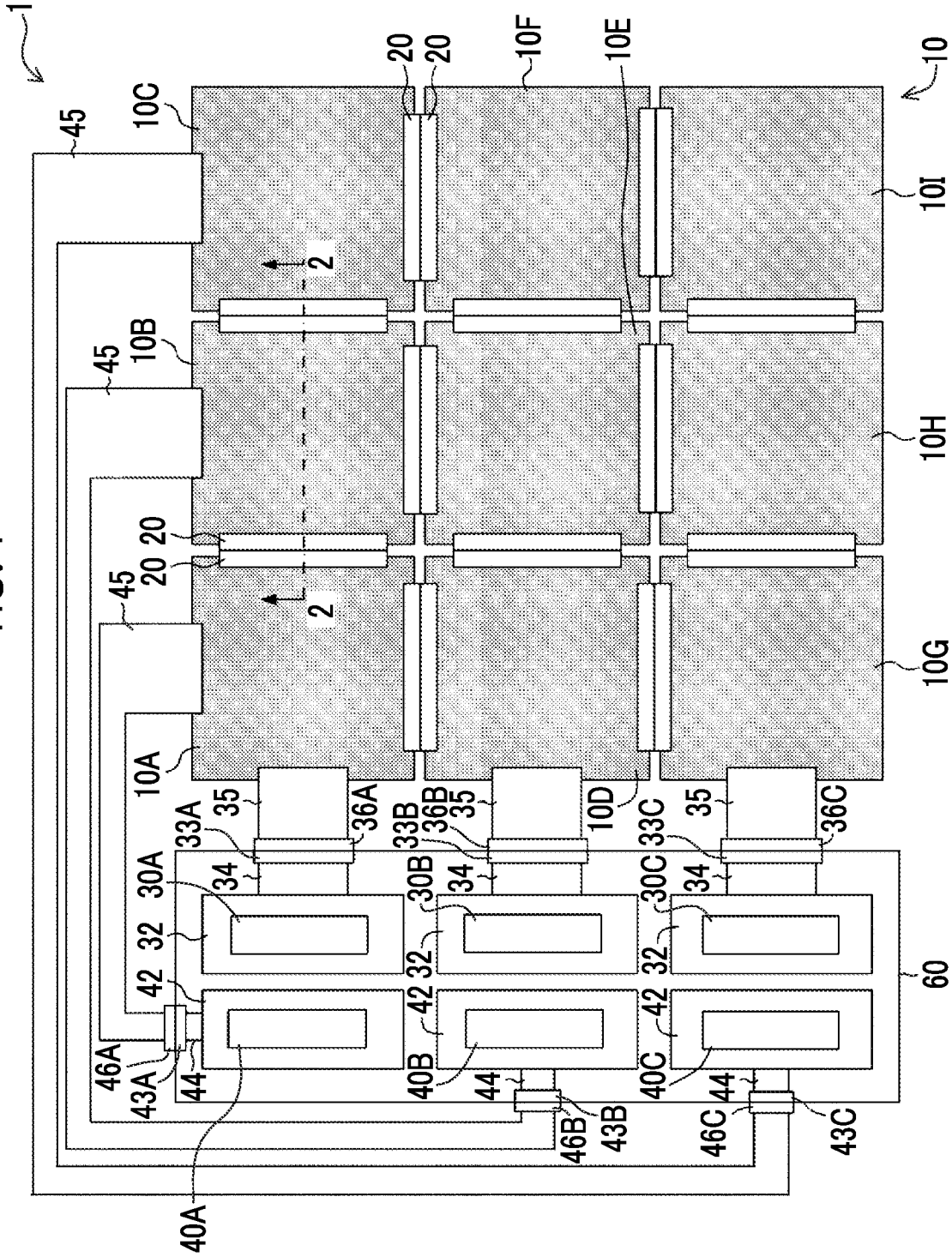
FIG. 1 is a plan view showing an example of a configuration of a radiography apparatus according to an embodiment of the disclosed technology.

Hereinafter, an example of an embodiment of the present invention will be described with reference to the drawings. In each drawing, the same or equivalent constituent elements and parts are denoted by the same reference numerals, and redundant description is omitted as appropriate.

First Embodiment

Figure 2:
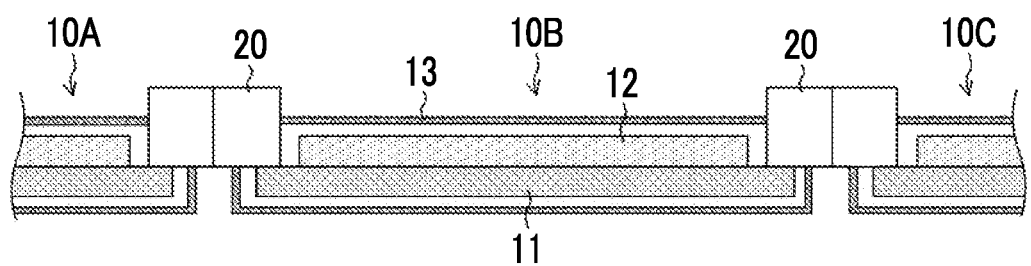
FIG. 2 is a cross-sectional view taken along line 2-2 in FIG. 1.

FIG. 1 is a plan view showing an example of a configuration of a radiography apparatus 1 according to an embodiment of the disclosed technology. FIG. 2 is a cross-sectional view taken along line 2-2 in FIG. 1.

The radiography apparatus 1 has a radiation detector 10 having a so-called DDA configuration. In addition, the radiation detector 10 is partitioned into a plurality of blocks 10A to 10I. The plurality of blocks 10A to 10I are arranged in a matrix. Each of the blocks 10A to 10I is electrically and mechanically connected to an adjacent block via a connector 20. For example, the block 10A is connected to the block 10B adjacent in a horizontal direction in the drawing via the connector 20, and is connected to the block 10D adjacent in a vertical direction in the drawing via the connector 20. The detailed configuration of the connector 20 connecting the blocks of the radiation detector 10 to each other will be described below. Although FIG. 1 illustrates a case where the radiation detector 10 is partitioned into nine blocks 10A to 10I, the number of partitions (number of blocks) of the radiation detector 10 can be changed as appropriate.

As shown in FIG. 2, each of the blocks 10A to 10I of the radiation detector 10 has a substrate 11 provided with a plurality of pixels 15 (see FIG. 3), a scintillator 12 laminated on the substrate 11, the connector 20 mounted on the substrate 11, and a housing 13 accommodating the substrate 11 and the scintillator 12 therein. That is, the blocks 10A to 10I have separate substrates 11 and scintillators 12.

The substrate 11 is a flexible substrate having flexibility. As a material of the substrate 11, for example, a resin sheet containing a plastic such as polyimide (PI) can be used. A thickness of the substrate 11 need only be such as to obtain desired flexibility depending on the hardness of the material, the size of the substrate 11, and the like. A thickness of the resin sheet need only be, for example, 5 μm to 125 μm, and more preferably 20 μm to 50 μm. Specific examples of the resin sheet include XENOMAX (registered trademark).

The scintillator 12 and the housing 13 each have flexibility, similarly to the substrate 11. As a material of the scintillator 12, $Gd_2O_2S$: Tb (terbium-doped gadolinium oxysulfide) can be used. The housing 13 is made of a flexible resin having a relatively high transmittance for X-rays. In the present embodiment, out of the scintillator 12 and the substrate 11, the scintillator 12 side is an incident side of radiation.

Figure 3:
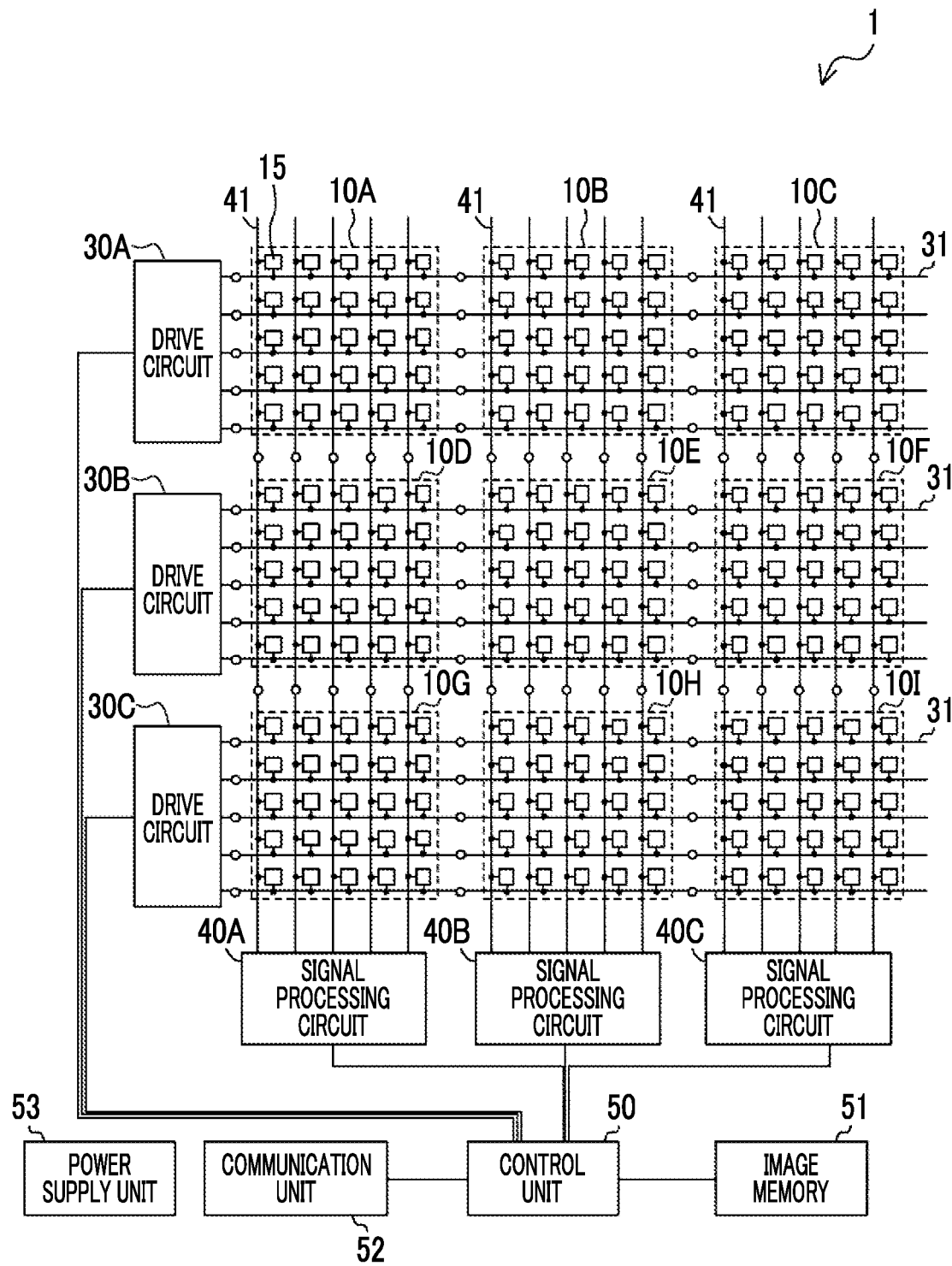
FIG. 3 is a diagram showing an example of an electric configuration of the radiography apparatus according to the embodiment of the disclosed technology.
Figure 4:
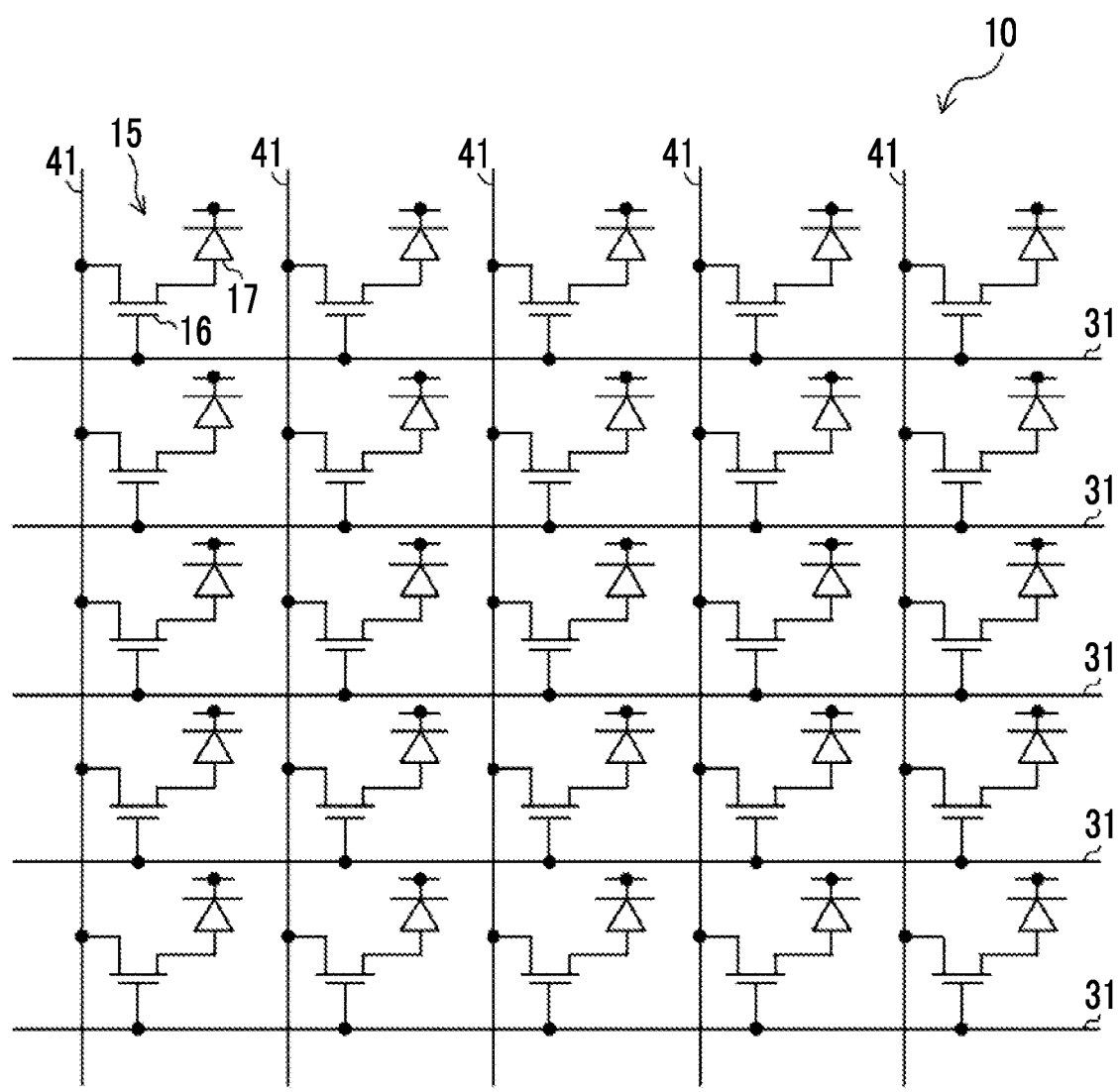
FIG. 4 is a diagram showing an example of a configuration of a plurality of pixels constituting a radiation detector according to the embodiment of the disclosed technology.

FIG. 3 is a view showing an example of an electric configuration of the radiography apparatus 1. FIG. 4 is a diagram showing an example of a configuration of the plurality of pixels 15 constituting the radiation detector 10.

Each of the blocks 10A to 10I of the radiation detector 10 has the plurality of pixels 15 arranged in a matrix on the substrate 11. Each of the plurality of pixels 15 includes a photoelectric conversion element 17 that generates an electric charge based on light emitted from the scintillator 12, and a thin film transistor (TFT) 16 as a switching element which is turned on in a case where the electric charge generated in the photoelectric conversion elements 17 is read out. The photoelectric conversion element 17 may be, for example, a photodiode formed of amorphous silicon.

On a surface of the substrate 11 constituting each of the blocks 10A to 10I of the radiation detector 10, a gate line 31 extending in one direction (row direction) along the arrangement of the pixels 15 and a signal line 41 extending in a direction (column direction) intersecting the extending direction of the gate line 31 are provided. Each of the pixels 15 is provided corresponding to each intersection part of the gate line 31 and the signal line 41.

The connection of the gate line 31 and the signal line 41 between the blocks of the radiation detector 10 is performed by the connector 20. For example, the gate line 31 of the block 10A and the gate line 31 of the block 10B are connected by the connector 20 that connects these blocks to each other. In addition, the signal line 41 of the block 10A and the signal line 41 of the block 10D are connected by the connector 20 that connects these blocks to each other.

Each of the gate lines 31 extending over the blocks 10A, 10B, and 10C of the radiation detector 10 is connected to a drive circuit 30A. Each of the gate lines 31 extending over the blocks 10D, 10E, and 10F of the radiation detector 10 is connected to a drive circuit 30B. Each of the gate lines 31 extending over the blocks 10G, 10H, and 10I of the radiation detector 10 is connected to a drive circuit 30C. The connection between the blocks 10A to 10I of the radiation detector 10 and the drive circuits 30A to 30C will be described in detail below.

Each of the signal lines 41 extending over the blocks 10A, 10D, and 10G of the radiation detector 10 is connected to a signal processing circuit 40A. Each of the signal lines 41 extending over the blocks 10B, 10E, and 10H of the radiation detector 10 is connected to a signal processing circuit 40B. Each of the signal lines 41 extending over the blocks 10C, 10F, and 10I of the radiation detector 10 is connected to a signal processing circuit 40C. The connection between the blocks 10A to 10I of the radiation detector 10 and the signal processing circuits 40A to 40C will be described in detail below.

The drive circuits 30A, 30B, and 30C each output a drive signal based on a control signal supplied from a control unit 50 to read out the electric charge accumulated in the pixel 15. The signal processing circuits 40A, 40B, and 40C each generate image data by performing predetermined processing on an electric signal due to the electric charge read out from the pixel 15 based on the control signal supplied from the control unit 50.

The signal processing circuits 40A, 40B, and 40C each comprise an amplification circuit that amplifies an input electric signal and a sample-and-hold circuit (neither shown) for each signal line 41. In addition, the signal processing circuits 40A, 40B, and 40C each have a multiplexer and an analog-to-digital (AD) converter (neither shown) provided in a subsequent stage of the sample-and-hold circuit.

The electric signals transmitted to the individual signal lines 41 are amplified by the amplification circuits and then held by the sample-and-hold circuits. The electric signals held by the individual sample-and-hold circuits are input (serially) in sequence to the multiplexer. The electric signals sequentially selected by the multiplexer are converted into digital image data by the AD converter.

The pieces of image data generated by the signal processing circuits 40A, 40B, and 40C are sequentially output to the control unit 50 and sequentially stored in an image memory 51. The image memory 51 has a storage capacity capable of storing a predetermined number of image data, and each time a radiation image is captured, image data obtained by imaging is stored in the image memory 51.

The control unit 50 controls the operation of the radiography apparatus 1 by controlling the drive circuits 30A, 30B, and 30C, the signal processing circuits 40A, 40B, and 40C, and the image memory 51. The control unit 50 may include a microcomputer comprising a central processing unit (CPU), a memory including a read only memory (ROM) and a random access memory (RAM), and a non-volatile storage unit such as a flash memory.

A communication unit 52 is connected to the control unit 50 and transmits and receives various kinds of information to and from an external device by wireless communication. For example, the communication unit 52 transmits the radiation image stored in the image memory 51 to an external device such as a personal computer.

A power supply unit 53 supplies electric power to the drive circuits 30A, 30B, and 30C, the signal processing circuits 40A, 40B, and 40C, the image memory 51, the control unit 50, and the communication unit 52. In FIG. 3, in order to avoid the complexity of the drawing, wiring connecting the power supply unit 53 and various circuits is not shown.

As shown in FIG. 1, the drive circuits 30A, 30B, and 30C are mounted on separate circuit boards 32, respectively. Similarly, the signal processing circuits 40A, 40B, and 40C are mounted on separate circuit boards 42, respectively. The circuit boards 32 and 42 are accommodated in a common case 60, respectively. The case 60 accommodating the drive circuits 30A, 30B, and 30C and the signal processing circuits 40A, 40B, and 40C therein is provided along one side of the radiation detector 10 having the laminate including the scintillator 12 and the substrate 11. The control unit 50, the image memory 51, the communication unit 52, and the power supply unit 53 (not shown in FIG. 1) may be accommodated in the case 60.

Connectors 33A, 33B, and 33C respectively corresponding to the drive circuits 30A, 30B, and 30C are provided on a surface of the case 60. Output terminals of the drive circuits 30A, 30B, and 30C are led out to the corresponding connectors 33A, 33B, and 33C, respectively, via flexible cables 34. In addition, connectors 43A, 43B, and 43C respectively corresponding to the signal processing circuits 40A, 40B, and 40C are provided on the surface of the case 60. Output terminals of the signal processing circuits 40A, 40B, and 40C are led out to the corresponding connectors 43A, 43B, and 43C, respectively, via flexible cables 44.

The gate lines 31 extending over the blocks 10A, 10B, and 10C of the radiation detector 10 are led out to a connector 36A at an end part of the block 10A via a flexible cable 35 connected to the gate lines 31. By connecting the connector 36A led out from the radiation detector 10 and the connector 33A led out from the drive circuit 30A to each other, the drive signal output from the drive circuit 30A is supplied to the gate lines 31 extending over the blocks 10A, 10B, and 10C of the radiation detector 10.

Similarly, the gate lines 31 extending over the blocks 10D, 10E, and 10F of the radiation detector 10 are led out to a connector 36B at an end part of the block 10D via a flexible cable 35 connected to the gate lines 31. By connecting the connector 36B led out from the radiation detector 10 and the connector 33B led out from the drive circuit 30B to each other, the drive signal output from the drive circuit 30B is supplied to the gate lines 31 extending over the blocks 10D, 10E, and 10F of the radiation detector 10.

Similarly, the gate lines 31 extending over the blocks 10G, 10H, and 10I of the radiation detector 10 are led out to a connector 36C at an end part of the block 10G via a flexible cable 35 connected to the gate lines 31. By connecting the connector 36C led out from the radiation detector 10 and the connector 33C led out from the drive circuit 30C to each other, the drive signal output from the drive circuit 30C is supplied to the gate lines 31 extending over the blocks 10G, 10H, and 10I of the radiation detector 10.

On the other hand, the signal lines 41 extending over the blocks 10A, 10D, and 10G of the radiation detector 10 are led out to a connector 46A at an end part of the block 10A via a flexible cable 45 connected to the signal lines 41. By connecting the connector 46A led out from the radiation detector 10 and the connector 43A led out from the signal processing circuit 40A to each other, the electric signals transmitted to the signal lines 41 extending over the blocks 10A, 10D, and 10G of the radiation detector 10 are supplied to the signal processing circuit 40A.

Similarly, the signal lines 41 extending over the blocks 10B, 10E, and 10H of the radiation detector 10 are led out to a connector 46B at an end part of the block 10B via a flexible cable 45 connected to the signal lines 41. By connecting the connector 46B led out from the radiation detector 10 and the connector 43B led out from the signal processing circuit 40B to each other, the electric signals transmitted to the signal lines 41 extending over the blocks 10B, 10E, and 10H of the radiation detector 10 are supplied to the signal processing circuit 40B.

Similarly, the signal lines 41 extending over the blocks 10C, 10F, and 10I of the radiation detector 10 are led out to a connector 46C at an end part of the block 10C via a flexible cable 45 connected to the signal lines 41. By connecting the connector 46C led out from the radiation detector 10 and the connector 43C led out from the signal processing circuit 40C to each other, the electric signals transmitted to the signal lines 41 extending over the blocks 10C, 10F, and 10I of the radiation detector 10 are supplied to the signal processing circuit 40C.

An example of the operation of the radiography apparatus 1 will be described below. In a case where radiation emitted from a radiation source (not shown) and transmitted through a subject is incident from the scintillator 12 side of the radiography apparatus 1, the scintillator 12 absorbs the radiation and emits visible light. The photoelectric conversion element 17 constituting the pixel 15 converts the light emitted from the scintillator 12 into an electric charge. The electric charge generated by the photoelectric conversion element 17 is accumulated in the corresponding pixel 15. The amount of electric charge generated by the photoelectric conversion element 17 is reflected in a pixel value of the corresponding pixel 15.

In a case where a radiation image is generated, the drive circuits 30A, 30B, and 30C supply the drive signal to the TFT 16 via the gate lines 31 based on the control signal supplied from the control unit 50. The TFT 16 is turned on in units of rows by the drive signal. In a case where the TFT 16 is turned on, the electric charge accumulated in the pixel 15 is read out to the signal line 41 and supplied to the signal processing circuits 40A, 40B, and 40C.

Each of the signal processing circuits 40A to 40C includes an amplification circuit, a sample-and-hold circuit, a multiplexer, and an AD converter (not shown). The electric signals transmitted to the individual signal lines 41 are amplified by the amplification circuits and then held by the sample-and-hold circuits. The electric signals held by the individual sample-and-hold circuits are input (serially) in sequence to the multiplexer. The electric signals sequentially selected by the multiplexer are converted into digital signals by the AD converter. The signal processing circuits 40A, 40B, and 40C generate data in which the digital signal is associated with position information of the pixel 15 as image data. The image memory 51 stores the image data generated by the signal processing circuits 40A, 40B, and 40C.

Figure 5A:
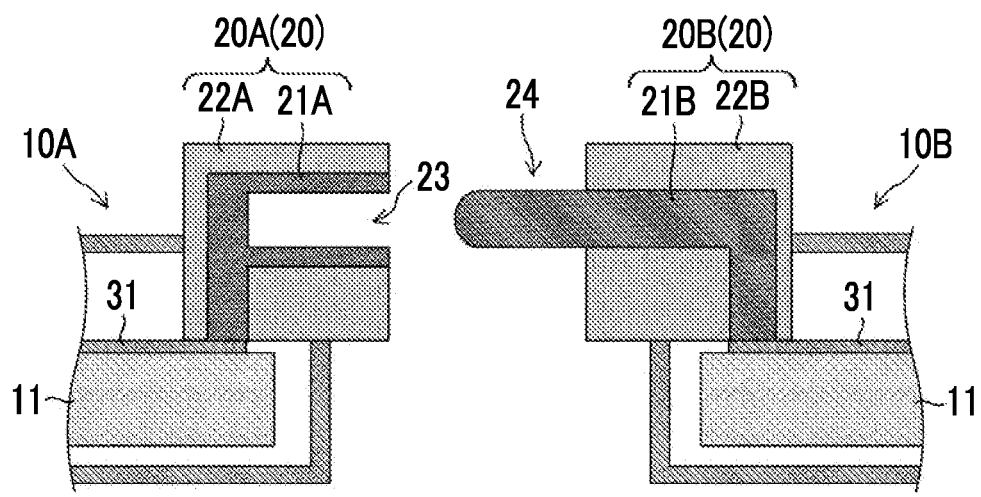
FIG. 5A is a diagram showing an example of a configuration of a connector that connects blocks of the radiation detector according to the embodiment of the disclosed technology to each other.
Figure 5B:
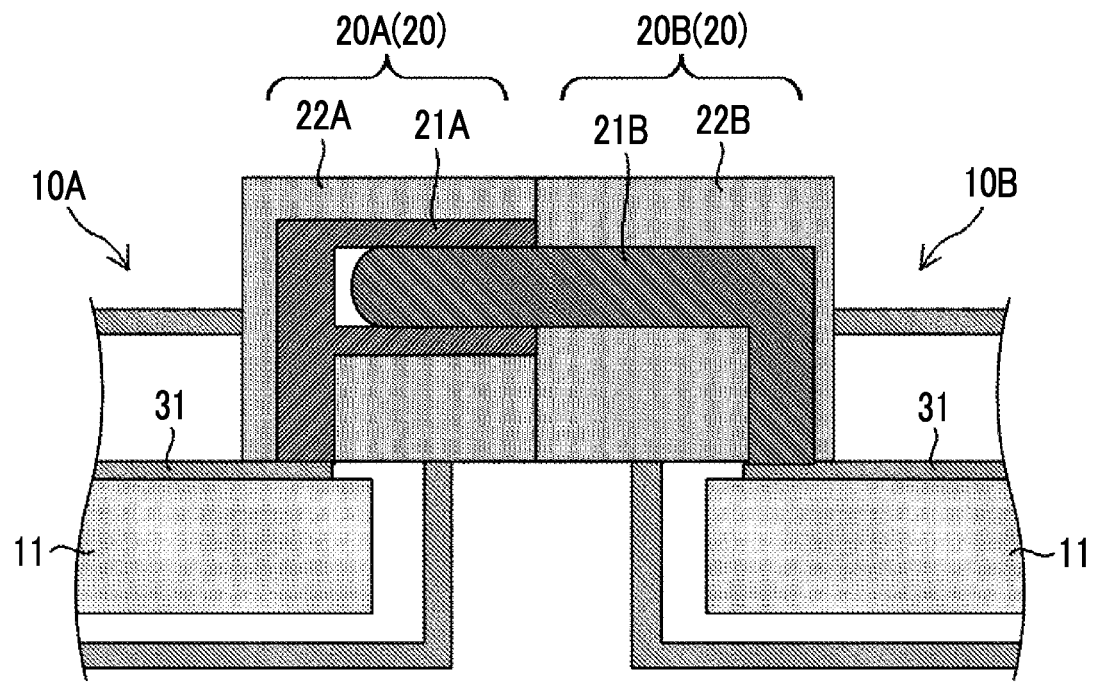
FIG. 5B is a diagram showing an example of the configuration of the connector that connects the blocks of the radiation detector according to the embodiment of the disclosed technology to each other.

Each of FIGS. 5A and 5B is a diagram showing an example of the configuration of the connector 20 that connects the blocks of the radiation detector 10 to each other. FIGS. 5A and 5B show, as an example, a connector for connecting the block 10A and the block 10B of the radiation detector 10 to each other. In addition, in FIGS. 5A and 5B, in order to distinguish between the two connectors, a reference numeral 20A is given to the connector provided in the block 10A, and a reference numeral 20B is given to the connector provided in the block 10B.

The connector 20A provided in the block 10A of the radiation detector 10 has a conductive portion 21A connected to the gate line 31 on the substrate 11 constituting the block 10A. A plurality of the conductive portions 21A are provided corresponding to each of a plurality of the gate lines on the substrate 11 constituting the block 10A. A periphery of the conductive portion 21A is covered with an insulating portion 22A. The plurality of conductive portions 21A are insulated from each other by the insulating portion 22A. As a material of the conductive portion 21A, for example, a silicone rubber in which conductive fine particles such as silver-based fine powder are dispersed can be used. As a material of the insulating portion 22A, for example, an insulating silicone rubber can be used. Since both the conductive portion 21A and the insulating portion 22A are made of a flexible material such as a silicone rubber, the connector 20A has flexibility as a whole.

Similarly, the connector 20B provided in the block 10B of the radiation detector 10 has a conductive portion 21B connected to the gate line 31 on the substrate 11 constituting the block 10B. A plurality of the conductive portions 21B are provided corresponding to each of a plurality of the gate lines on the substrate 11 constituting the block 10B. A periphery of the conductive portion 21B is covered with an insulating portion 22B. The plurality of conductive portions 21B are insulated from each other by the insulating portion 22B. As a material of the conductive portion 21B, the same material as that of the conductive portion 21A can be used. As a material of the insulating portion 22B, the same material as that of the insulating portion 22A can be used. Since both the conductive portion 21B and the insulating portion 22B are made of a flexible material such as a silicone rubber, the connector 20B has flexibility as a whole.

The conductive portion 21A of the connector 20A has a concave portion 23, and the conductive portion 21B of the connector 20B has a convex portion 24. As shown in FIG. 5B, in a case where the convex portion 24 of the conductive portion 21B is fitted into the concave portion 23 of the conductive portion 21A, the conductive portion 21A and the conductive portion 21B are connected to each other, and the block 10A and the block 10B of the radiation detector 10 are electrically and mechanically connected to each other. That is, each of the gate lines 31 of the block 10A is connected to each of the corresponding gate lines 31 of the block 10B.

The joining between the connector 20A and the connector 20B can be released by applying a force in a direction in which the connector 20A and the connector 20B are separated from each other. As a result, the block 10B of the radiation detector 10 can be separated from the block 10A. That is, after the connector 20A and the connector 20B are joined together, the state shown in FIG. 5A can be achieved. Thereafter, the state (that is, the state shown in FIG. 5B) in which the connector 20A and the connector 20B are joined together can also be achieved.

In the above description, although the connectors 20A and 20B used for connecting the block 10A and the block 10B of the radiation detector 10 to each other have been described, the configuration of the connector 20 for connecting the other blocks to each other is the same.

As described above, the radiography apparatus 1 according to the embodiment of the disclosed technology includes the scintillator 12 and the substrate 11 that is laminated on the scintillator 12 and has a plurality of the photoelectric conversion elements 17 converting light emitted from the scintillator 12 into the electric charges. The radiation detector 10 comprising the laminate including the scintillator 12 and the substrate 11 is partitioned into the plurality of blocks 10A to 10I. Each of the plurality of blocks 10A to 10I has the connector 20 provided in a boundary portion with another block, and the blocks are separable from each other.

The radiography apparatus 1 has, in each of the blocks 10A to 10I, a plurality of the TFTs 16 as the switching elements provided on the substrate 11 and provided corresponding to the plurality of photoelectric conversion elements 17, a plurality of the gate lines 31 provided on the substrate 11 and transmitting the drive signals for driving the plurality of TFTs 16, and a plurality of the signal lines 41 provided on the substrate 11 and transmitting the electric signals based on the electric charges generated by the plurality of photoelectric conversion elements 17.

In addition, the radiography apparatus 1 has a plurality of the drive circuits 30A, 30B, and 30C connected to some different gate lines 31 among the plurality of gate lines 31 and outputting the drive signals for driving the TFTs 16, respectively, and a plurality of the signal processing circuits 40A, 40B, and 40C connected to some different signal lines 41 among the plurality of signal lines 41 and processing the electric signals transmitted to the signal lines 41, respectively.

In each of the plurality of blocks 10A to 10I, the gate lines 31 included in the block are connected to one of the plurality of drive circuits 30A, 30B, and 30C. That is, the gate lines 31 included in one block are not connected across a plurality of different drive circuits. For example, each of the gate lines 31 extending over the blocks 10A, 10B, and 10C is connected only to the drive circuit 30A and not to the other drive circuits 30B and 30C.

In addition, in each of the plurality of blocks 10A to 10I, the signal lines 41 included in the block are connected to one of the plurality of signal processing circuits 40A, 40B, and 40C. That is, the signal lines 41 included in one block are not connected across a plurality of different signal processing circuits. For example, each of the signal lines 41 extending over the blocks 10A, 10D, and 10G is connected only to the signal processing circuit 40A and not to the other signal processing circuits 40B and 40C. As described above, the partition of the radiation detector 10 is defined by the drive circuits 30A to 30C and the signal processing circuits 40A to 40C.

In the radiography apparatus 1 according to the present embodiment, since the substrate 11, the scintillator 12, and the housing 13 constituting each of the blocks 10A to 10I of the radiation detector 10 have flexibility, the radiation detector 10 has flexibility as a whole. Therefore, the radiation detector 10 can be wound around the surface of the pipe. Accordingly, the radiography apparatus 1 can be used for non-destructive testing of the welded portion of the pipe. Since there is a gap in the boundary portion between the blocks 10A to 10I of the radiation detector 10, an image of the gap is missed. In a case where the missing of the image is a problem, for example, it is possible to cope with the problem by performing first imaging and then performing second imaging in a state where the position of the radiation detector 10 is shifted, and performing processing for complementing the missing part in a radiation image obtained by the first imaging with a radiation image obtained by the second imaging.

In addition, in the radiography apparatus 1 according to the present embodiment, it is possible to perform separation of the blocks of the radiation detector 10 in an aspect illustrated below. Each of FIGS. 6A to 6E is a plan view illustrating an aspect of separation of the blocks of the radiation detector 10.

Figure 6A:
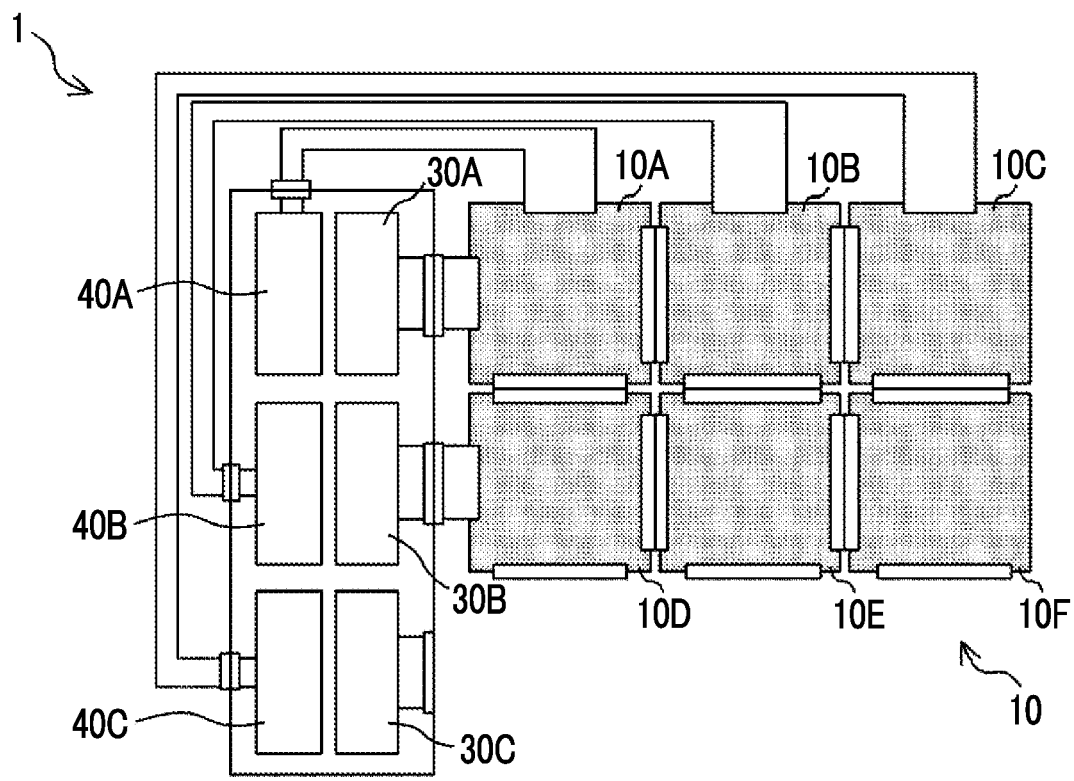
FIG. 6A is a plan view illustrating an aspect of separation of blocks of the radiation detector according to the embodiment of the disclosed technology.
Figure 6B:
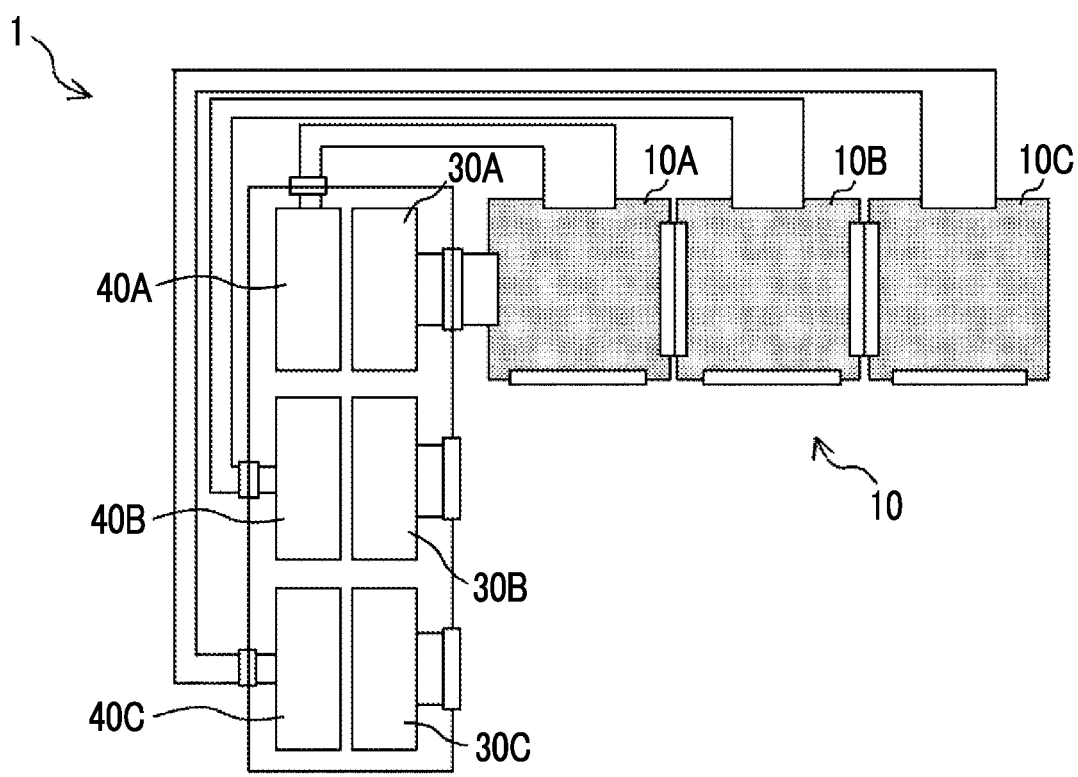
FIG. 6B is a plan view illustrating an aspect of separation of the blocks of the radiation detector according to the embodiment of the disclosed technology.
Figure 6C:
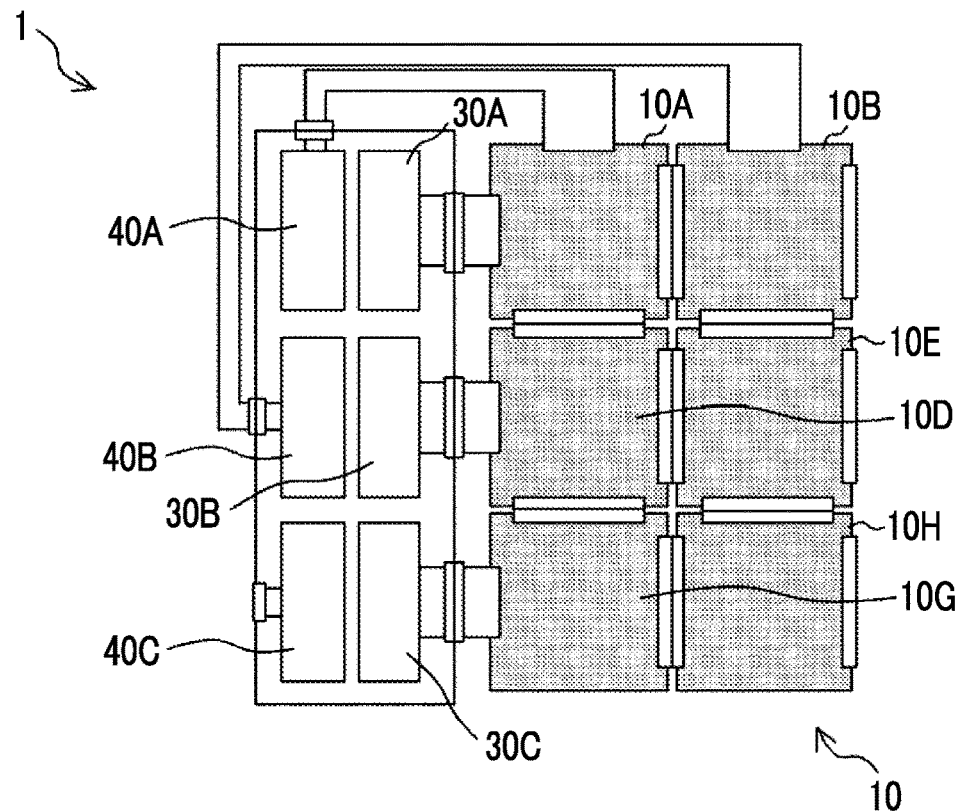
FIG. 6C is a plan view illustrating an aspect of separation of the blocks of the radiation detector according to the embodiment of the disclosed technology.
Figure 6D:
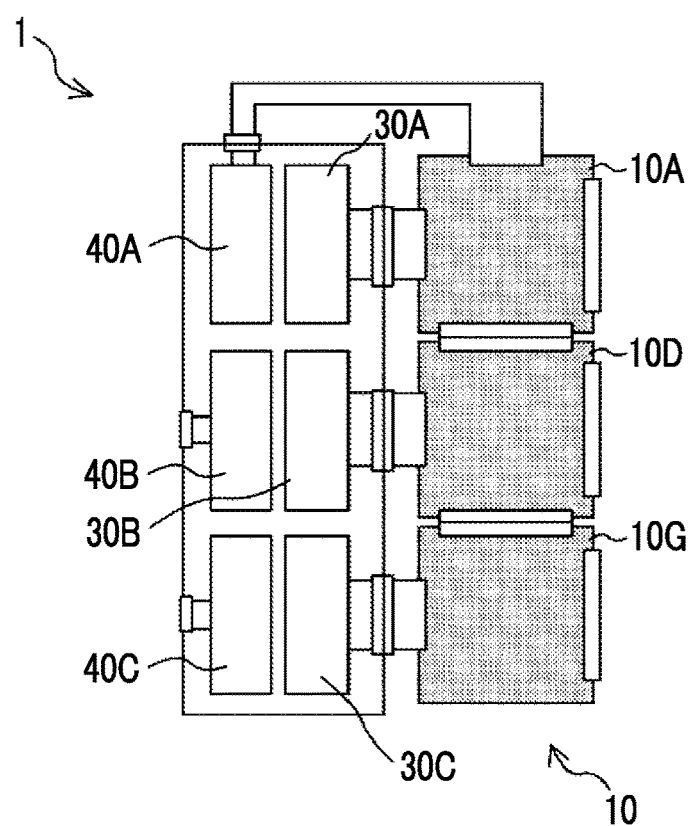
FIG. 6D is a plan view illustrating an aspect of separation of the blocks of the radiation detector according to the embodiment of the disclosed technology.
Figure 6E:
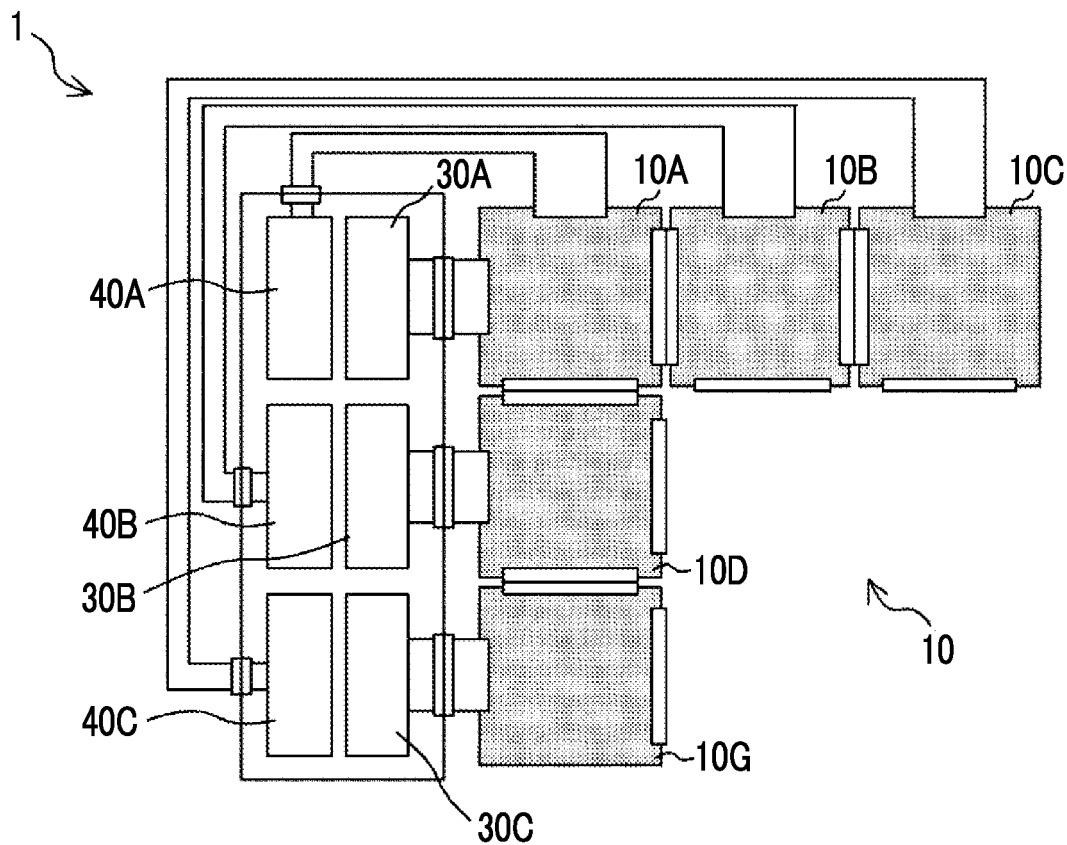
FIG. 6E is a plan view illustrating an aspect of separation of the blocks of the radiation detector according to the embodiment of the disclosed technology.

FIG. 6A shows a state of separation of the blocks 10G, 10H, and 10I of the radiation detector 10, and FIG. 6B shows a state of separation of the blocks 10D, 10E, 10F, 10G, 10H, and 10I of the radiation detector 10. FIG. 6C shows a state of separation of the blocks 10C, 10F, and 10I of the radiation detector 10, and FIG. 6D shows a state of separation of the blocks 10B, 10E, 10H, 10C, 10F, and 10I of the radiation detector 10. FIG. 6E shows a state of separation of the blocks 10E, 10F, 10H, and 10I of the radiation detector 10. Even in a case where separation of the blocks of the radiation detector 10 is performed in the aspect illustrated above, the supply of the drive signal via the gate line 31 and the transmission of the electric signal via the signal line 41 to each block other than the separated blocks are not interrupted, and the capturing of the radiation image can be properly performed in each block other than the separated blocks.

In this way, since the blocks 10A to 10I of the radiation detector 10 are separable from each other, the shape and size of the radiation detector 10 can be changed at the imaging site. For example, in a case where the radiography apparatus 1 is used for non-destructive testing of the welded portion of the pipe, the shape and size of the radiation detector 10 is adapted to the shape and size of the pipe by appropriately separating the blocks of the radiation detector 10 in accordance with the shape and size of the pipe. In addition, it is possible to reconnect the separated blocks.

In addition, even in a case where a failure or damage occurs in some blocks of the radiation detector 10, the use of the radiation detector 10 is enabled by replacing only the some blocks in which the failure or damage occurs. As a result, it is possible to suppress the repair cost of the radiation detector 10.

In the radiography apparatus 1 according to the embodiment of the disclosed technology, the blocks 10A to 10I of the radiation detector 10 correspond to the drive circuits 30A to 30C and the signal processing circuits 40A to 40C. Therefore, the design of the radiography apparatus in the structural and control aspects is facilitated. In particular, in the radiography apparatus 1 according to the present embodiment, each of the gate lines 31 included in one block is connected to one of the plurality of drive circuits 30A to 30C, and each of the signal lines 41 included in one block is connected to one of the plurality of signal processing circuits 40A to 40C. As a result, the size of one block can be reduced as compared with a case where each of the gate lines 31 included in one block is connected to any two or more of the plurality of drive circuits 30A to 30C, and each of the signal lines 41 included in one block is connected to any two or more of the plurality of signal processing circuits 40A to 40C. Thus, the shape and size of the radiation detector 10 can be changed more flexibly.

In addition, in the radiography apparatus 1 according to the embodiment of the disclosed technology, the drive circuits 30A, 30B, and 30C and the signal processing circuits 40A, 40B, and 40C are provided along one side of the radiation detector 10.

For example, in a case where the drive circuits 30A, 30B, and 30C are provided along a first side of the radiation detector 10, and the signal processing circuits 40A, 40B, and 40C are provided along a second side intersecting the first side, it may be difficult to use the radiation detector 10 in a bent manner. In addition, in a case where the drive circuits 30A, 30B, and 30C are provided along the first side of the radiation detector 10, and the signal processing circuits 40A, 40B, and 40C are provided along the second side opposite to the first side, the drive circuits 30A, 30B, and 30C are separated from the signal processing circuits 40A, 40B, and 40C. Therefore, the leading of wiring from the control unit 50 is complicated.

In the radiography apparatus 1 according to the embodiment of the disclosed technology, the drive circuits 30A, 30B, and 30C and the signal processing circuits 40A, 40B, and 40C are provided along one side of the radiation detector 10. Therefore, the radiation detector 10 can be used in a bent manner, and the complication of the leading of the wiring from the control unit 50 can be suppressed.

Second Embodiment

Figure 7:
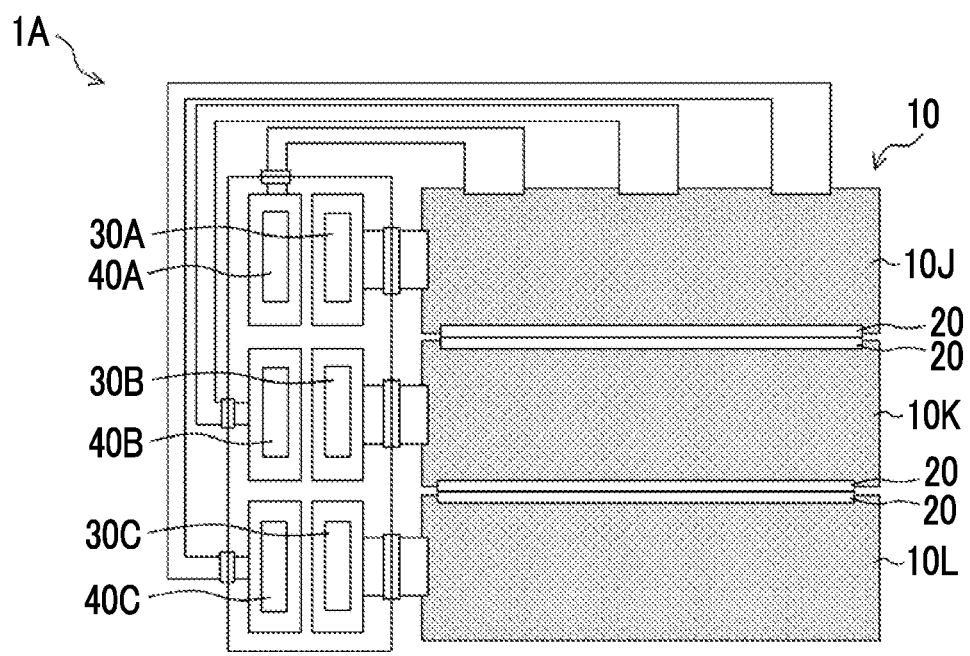
FIG. 7 is a plan view showing an example of a configuration of a radiography apparatus according to another embodiment of the disclosed technology.

FIG. 7 is a plan view showing an example of a configuration of a radiography apparatus 1A according to a second embodiment of the disclosed technology.

The radiography apparatus 1A is different from the radiography apparatus 1 according to the first embodiment in the block configuration of the radiation detector 10. That is, the radiation detector 10 according to the present embodiment is partitioned into three blocks 10J, 10K, and 10L.

The block 10J is an integrated block of the blocks 10A, 10B, and 10C according to the first embodiment. That is, the block 10J includes the entire gate line 31 through which the drive signal output from the drive circuit 30A is transmitted. The block 10K is an integrated block of the blocks 10D, 10E, and 10F according to the first embodiment. That is, the block 10K includes the entire gate line 31 through which the drive signal output from the drive circuit 30B is transmitted. The block 10L is an integrated block of the blocks 10G, 10H, and 10I according to the first embodiment. That is, the block 10L includes the entire gate line 31 through which the drive signal output from the drive circuit 30C is transmitted.

Figure 8A:
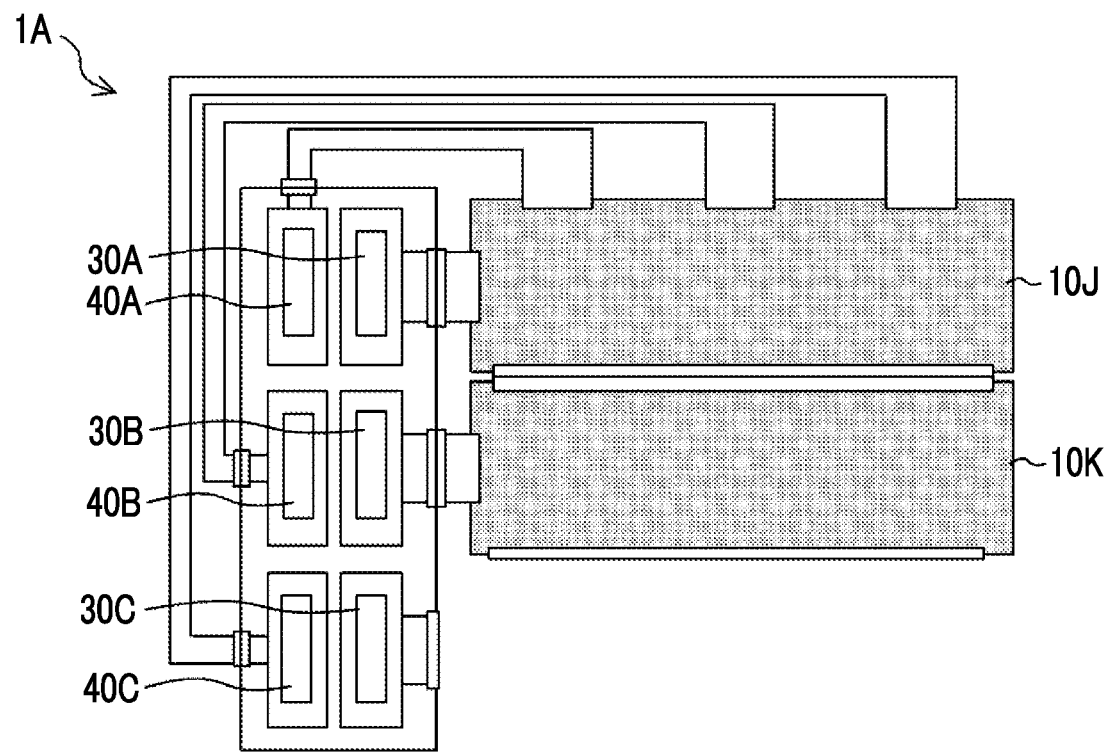
FIG. 8A is a plan view illustrating an aspect of separation of blocks of a radiation detector according to another embodiment of the disclosed technology.
Figure 8B:
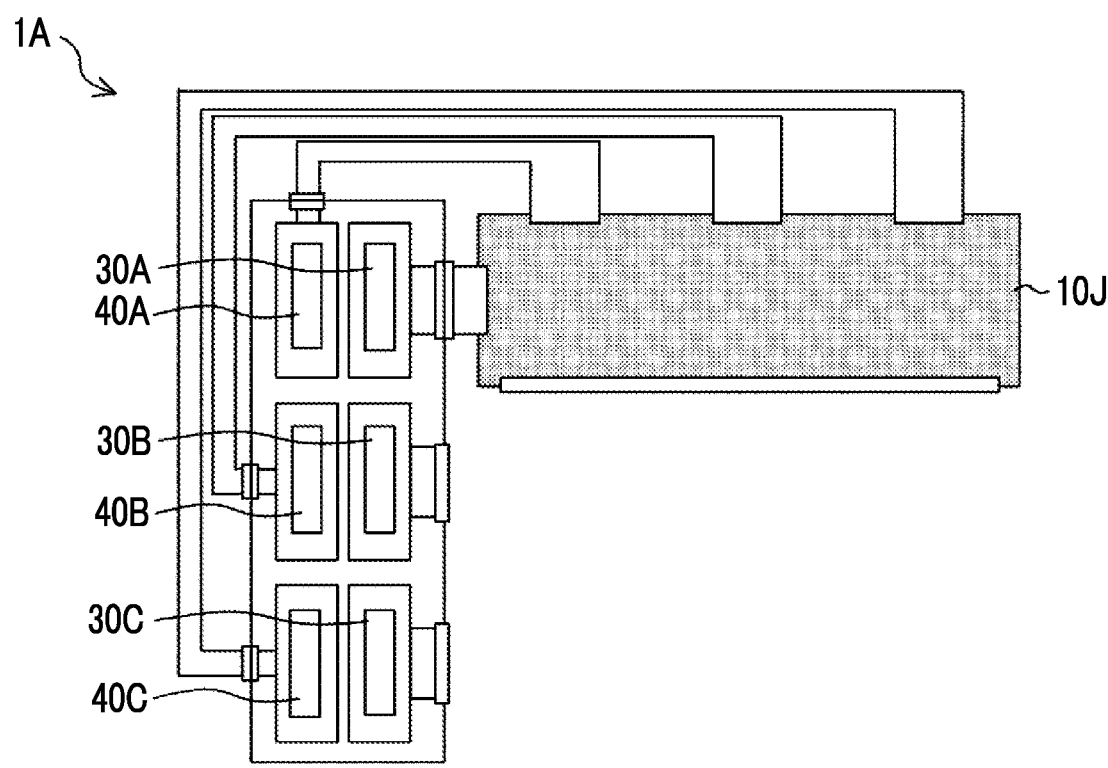
FIG. 8B is a plan view illustrating an aspect of separation of the blocks of the radiation detector according to another embodiment of the disclosed technology.

Each of FIGS. 8A and 8B is a plan view illustrating an aspect of separation of the blocks of the radiation detector 10. FIG. 8A shows a state of separation of the block 10L of the radiation detector 10, and FIG. 8B shows a state of separation of the blocks 10K and 10L of the radiation detector 10.

In the radiography apparatus 1A according to the second embodiment, as in the radiography apparatus 1 according to the first embodiment, since the blocks 10J to 10L of the radiation detector 10 are separable from each other, the shape and size of the radiation detector 10 can be changed at the imaging site.

Third Embodiment

Figure 9:
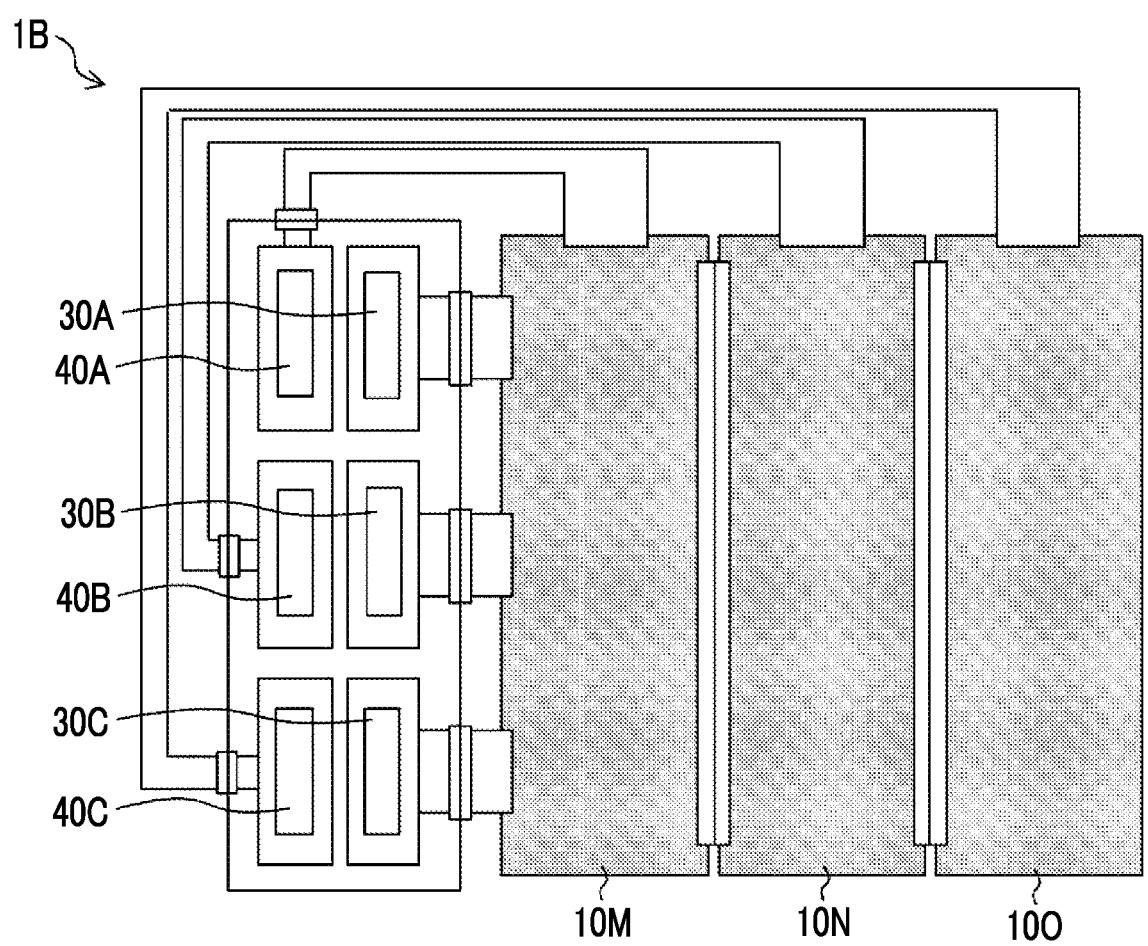
FIG. 9 is a plan view showing an example of a configuration of a radiography apparatus according to another embodiment of the disclosed technology.

FIG. 9 is a plan view showing an example of a configuration of a radiography apparatus 1B according to a third embodiment of the disclosed technology.

The radiography apparatus 1B is different from the radiography apparatus 1 according to the first embodiment in the block configuration of the radiation detector 10. That is, the radiation detector 10 according to the present embodiment is partitioned into three blocks 10M, 10N, and 10O.

The block 10M is an integrated block of the blocks 10A, 10D, and 10G according to the first embodiment. That is, the block 10M includes the entire signal line 41 through which the electric signal supplied to the signal processing circuit 40A is transmitted. The block 10N is an integrated block of the blocks 10B, 10E, and 10H according to the first embodiment. That is, the block 10N includes the entire signal line 41 through which the electric signal supplied to the signal processing circuit 40B is transmitted. The block 10O is an integrated block of the blocks 10C, 10F, and 10I according to the first embodiment. That is, the block 10O includes the entire signal line 41 through which the electric signal supplied to the signal processing circuit 40C is transmitted.

Figure 10A:
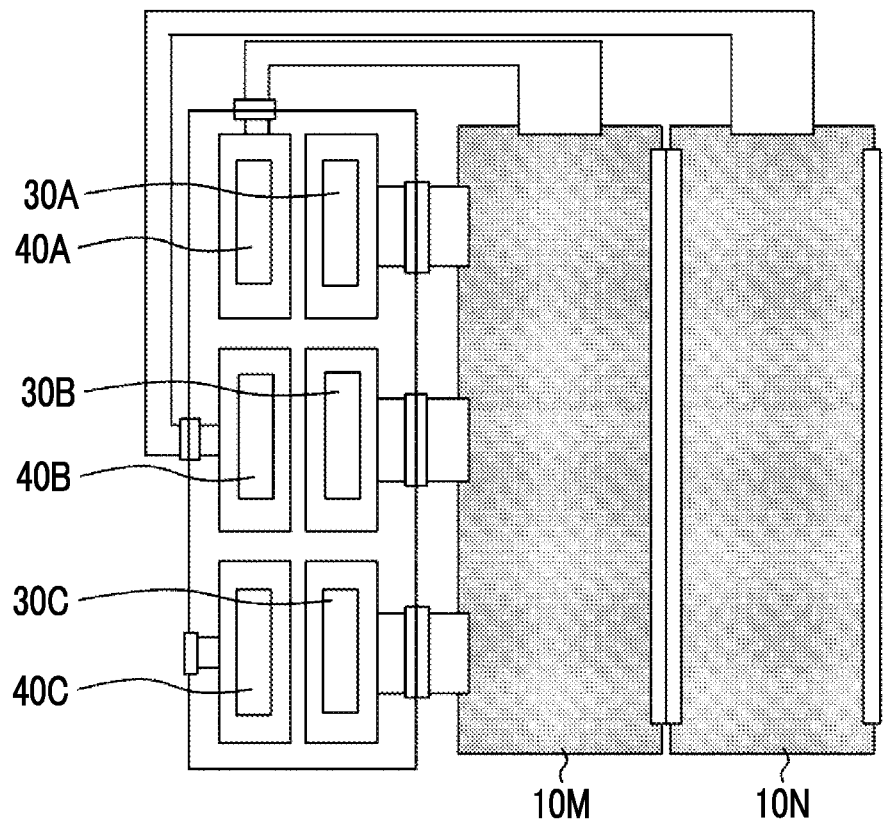
FIG. 10A is a plan view illustrating an aspect of separation of blocks of a radiation detector according to another embodiment of the disclosed technology.
Figure 10B:
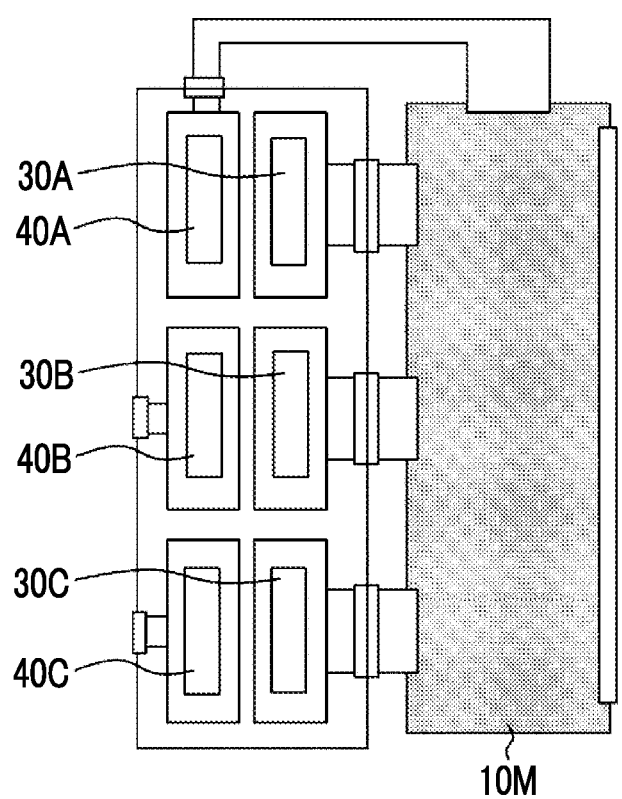
FIG. 10B is a plan view illustrating an aspect of separation of the blocks of the radiation detector according to another embodiment of the disclosed technology.

Each of FIGS. 10A and 10B is a plan view illustrating an aspect of separation of the blocks of the radiation detector 10. FIG. 10A shows a state of separation of the block 10O of the radiation detector 10, and FIG. 10B shows a state of separation of the blocks 10N and 10O of the radiation detector 10.

In the radiography apparatus 1B according to the third embodiment, as in the radiography apparatus 1 according to the first embodiment, since the blocks 10M to 10O of the radiation detector 10 are separable from each other, the shape and size of the radiation detector 10 can be changed at the imaging site.

Fourth Embodiment

Figure 11:
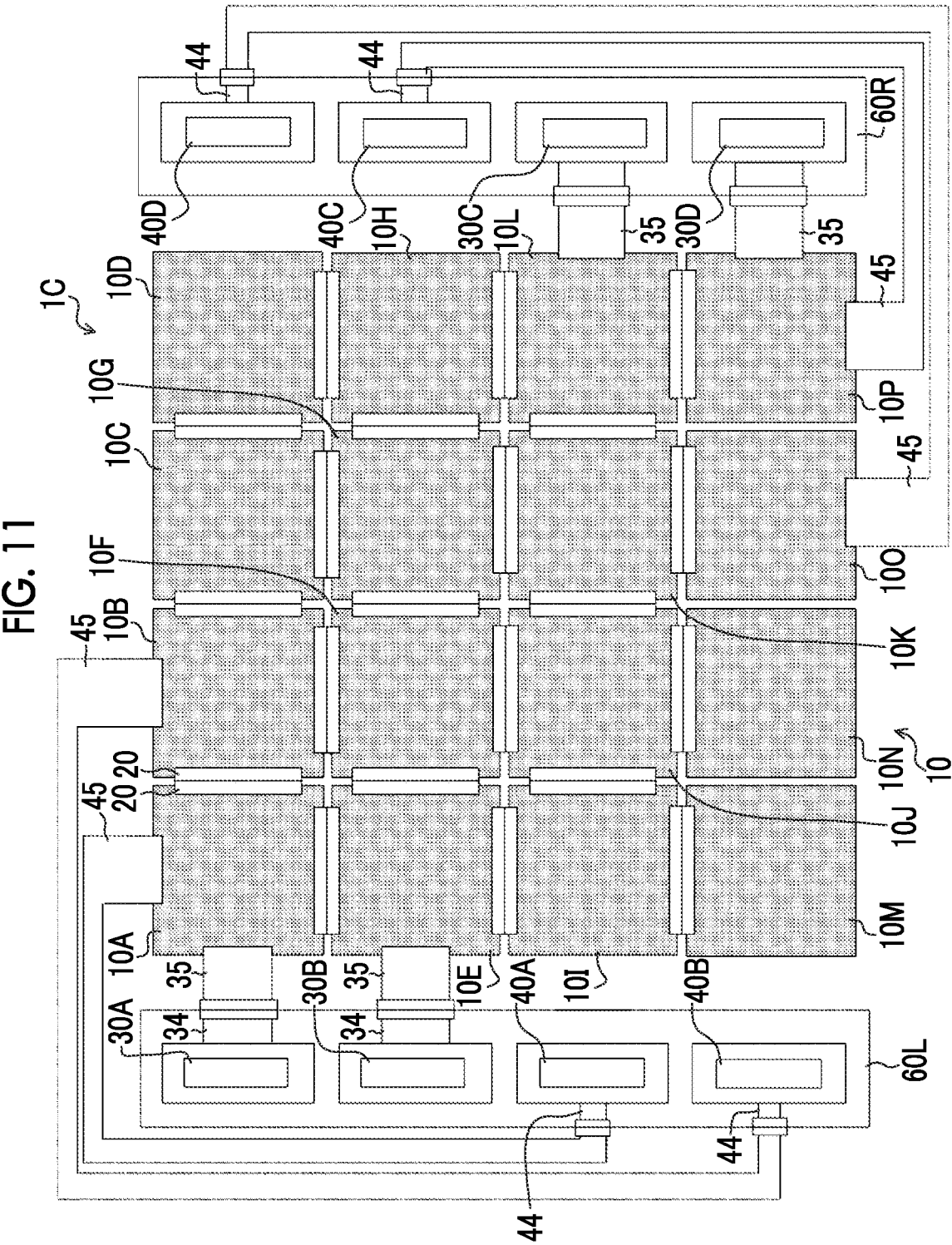
FIG. 11 is a plan view showing an example of a configuration of a radiography apparatus according to another embodiment of the disclosed technology.

FIG. 11 is a plan view showing an example of a configuration of a radiography apparatus 1C according to a fourth embodiment of the disclosed technology. In the radiography apparatus 1C, the radiation detector 10 is partitioned into a plurality of blocks 10A to 10P. In addition, the radiography apparatus 1C has drive circuits 30A, 30B, 30C, and 30D and signal processing circuits 40A, 40B, 40C, and 40D. A case 60L accommodating the drive circuits 30A and 30B and the signal processing circuits 40A and 40B therein is provided along the first side of the radiation detector 10. A case 60R accommodating the drive circuits 30C and 30D and the signal processing circuits 40C and 40D therein is provided along the second side of the radiation detector 10 opposite to the first side. As described above, in the radiography apparatus 1C according to the present embodiment, the drive circuits 30A and 30B and the signal processing circuits 40A and 40B are provided on one end side of the radiation detector 10, and the drive circuits 30C and 30D and the signal processing circuits 40C and 40D are provided on the other end side of the radiation detector 10.

Each of the gate lines 31 extending over the blocks 10A, 10B, 10C, and 10D of the radiation detector 10 is connected to the drive circuit 30A. Each of the gate lines 31 extending over the blocks 10E, 10F, 10G, and 10H of the radiation detector 10 is connected to the drive circuit 30B. Each of the gate lines 31 extending over the blocks 10I, 10J, 10K, and 10L of the radiation detector 10 is connected to the drive circuit 30C. Each of the gate lines 31 extending over the blocks 10M, 10N, 10O, and 10P of the radiation detector 10 is connected to the drive circuit 30D.

Each of the signal lines 41 extending over the blocks 10A, 10E, 10I, and 10M of the radiation detector 10 is connected to the signal processing circuit 40A. Each of the signal lines 41 extending over the blocks 10B, 10F, 10J, and 10N of the radiation detector 10 is connected to the signal processing circuit 40B. Each of the signal lines 41 extending over the blocks 10C, 10G, 10K, and 10O of the radiation detector 10 is connected to the signal processing circuit 40C. Each of the signal lines 41 extending over the blocks 10D, 10H, 10L, and 10P of the radiation detector 10 is connected to the signal processing circuit 40D.

The drive circuits 30A, 30B, 30C, and 30D each output the drive signal based on the control signal supplied from the control unit 50 to read out the electric charge accumulated in the pixel 15. The drive circuits 30A, 30B, 30C, and 30D are electrically connected to each other, and the drive circuits can operate in cooperation with each other. For example, the drive circuits 30A, 30B, 30C, and 30D can operate in cooperation with each other such that the drive signals are sequentially output from the drive circuits 30A, 30B, 30C, and 30D. The drive circuits 30A, 30B, 30C, and 30D may operate independently without cooperating with each other. The electrical connection among the drive circuits 30A, 30B, 30C, and 30D can be realized by wire or wireless.

The signal processing circuits 40A, 40B, 40C, and 40D each generate image data by performing predetermined processing on an electric signal due to the electric charge read out from the pixel 15 based on the control signal supplied from the control unit 50. The signal processing circuits 40A, 40B, 40C, and 40D are electrically connected to each other, and the signal processing circuits can operate in cooperation with each other. For example, the signal processing circuits 40A, 40B, 40C, and 40D can operate in cooperation with each other such that the pieces of image data are sequentially output from the signal processing circuits 40A, 40B, 40C, and 40D. The signal processing circuits 40A, 40B, 40C, and 40D may operate independently without cooperating with each other. The electrical connection among the signal processing circuits 40A, 40B, 40C, and 40D can be realized by wire or wireless.

In the first to fourth embodiments, a case where, after separation of some blocks of the radiation detector 10 is performed, the separated blocks can be reconnected is illustrated, but the present invention is not limited to this aspect. Each block of the radiation detector 10 may be separated in an aspect in which reconnection is not possible.

EXPLANATION OF REFERENCES 1A, 1B: radiography apparatus
10: radiation detector
10A to 10O: block
11: substrate
12: scintillator
13: housing
15: pixel
16: TFT
17: photoelectric conversion element
20, 20A, 20B: connector
21A, 21B: conductive portion
22A, 22B: insulating portion
23: concave portion
24: convex portion
30: drive circuit
30A, 30B, 30C: drive circuit
31: gate line
32: circuit board
33A, 33B, 33C: connector
34, 35: flexible cable
36A, 36B, 36C: connector
40A, 40B, 40C: signal processing circuit
41: signal line
42: circuit board
43A, 43B, 43C: connector
44, 45: flexible cable
46A, 46B, 46C: connector
50: control unit
51: image memory
52: communication unit
53: power supply unit
60: case

What is claimed is:

1. A radiography apparatus comprising:
a plurality of blocks, each of the plurality of blocks comprising:
a scintillator having flexibility;
a substrate which is a flexible substrate having flexibility, and on which a plurality of photoelectric conversion elements converting light emitted from the scintillator into electric charges are formed; and
a laminate in which the scintillator and the substrate are laminated,
wherein each block of the plurality of blocks is separable from and re-connectable to each other; and
the radiography apparatus further comprises:
a drive circuit formed separately from each of the plurality of blocks and connected to a first subset of blocks including one or more blocks aligned along a first direction; and
a signal processing circuit formed separately from each of the plurality of blocks and connected to a second subset of blocks including one or more blocks aligned along a second direction perpendicular to the first direction
wherein the drive circuit and the signal processing circuit are disposed at the second direction with respect to the aligned one or more blocks.

2. The radiography apparatus according to claim 1, further comprising:
a plurality of switching elements provided on the substrate and provided corresponding to the plurality of photoelectric conversion elements;
a plurality of gate lines provided on the substrate and transmitting drive signals for driving each of the plurality of switching elements;
a plurality of signal lines provided on the substrate and transmitting electric signals based on the electric charges generated by the plurality of photoelectric conversion elements;
wherein a plurality of drive circuits are connected to a part of different gate lines among the plurality of gate lines and outputting the drive signals, respectively; and
the plurality of signal processing circuits are connected to a part of different signal lines among the plurality of signal lines and processing the electric signals, respectively,
wherein in each of the plurality of blocks, each of the gate lines included in the block is connected to one of the plurality of drive circuits, and each of the signal lines included in the block is connected to one of the plurality of signal processing circuits.

3. The radiography apparatus according to claim 2, wherein the plurality of drive circuits and the plurality of signal processing circuits are provided along one side of the laminate.

4. The radiography apparatus according to claim 2, wherein the plurality of drive circuits and the plurality of signal processing circuits are provided along two sides of the laminate opposite to each other.

5. The radiography apparatus according to claim 4, wherein the plurality of drive circuits are electrically connected to each other, and
the plurality of signal processing circuits are electrically connected to each other.

6. The radiography apparatus of claim 1 wherein the first subset of the plurality of blocks are located at a periphery of the plurality of blocks and arranged in the first direction, and
wherein the second subset of the plurality of blocks are located a periphery of the plurality of blocks and arranged in the second direction.

7. The radiography apparatus of claim 1 wherein the drive circuit and the signal processing circuit are disposed at one side of the second direction with respect to the aligned one or more blocks.

* * * * *